United States Patent
Lilley et al.

(10) Patent No.: US 7,617,686 B2
(45) Date of Patent: Nov. 17, 2009

(54) METHOD FOR DETERMINATION OF THE TEMPERATURE, MASS-AVERAGED OVER A FLOW CROSS-SECTION, OF A GAS FLOW IN A GAS TURBINE

(75) Inventors: Darrel Shayne Lilley, Remetschwil (CH); Anton Nemet, Nussbaumen (CH); Andreas Rueter, Baden (CH)

(73) Assignee: Alstom Technology Ltd, Baden (CH)

( * ) Notice: Subject to any disclaimer, the term of this patent is extended or adjusted under 35 U.S.C. 154(b) by 511 days.

(21) Appl. No.: 11/269,675

(22) Filed: Nov. 9, 2005

(65) Prior Publication Data

US 2006/0096292 A1 May 11, 2006

(30) Foreign Application Priority Data

Nov. 9, 2004 (CH) .................................... 1841/04

(51) Int. Cl.
*F02C 1/00* (2006.01)
*G01K 1/00* (2006.01)
*G01M 15/00* (2006.01)

(52) U.S. Cl. ........................ 60/772; 702/130; 73/112.01

(58) Field of Classification Search .................... 60/772, 60/793; 702/99, 130, 131, 132, 133, 134, 702/135, 189, 190, 191, 192, 193, 194, 195, 702/196, 197, 198, 199; 73/112.01, 112.03, 73/112.05
See application file for complete search history.

(56) References Cited

U.S. PATENT DOCUMENTS 3,636,335 A    1/1972 Nelson et al.
3,719,071 A *  3/1973 Hohenberg .................. 374/111
3,721,120 A *  3/1973 Howell et al. ............. 73/112.03
3,817,100 A *  6/1974 Anderson et al. ......... 73/861.63

(Continued)

FOREIGN PATENT DOCUMENTS

DE    1 476 778 A1    5/1969

(Continued)

OTHER PUBLICATIONS

European Search Report dated Feb. 14, 2006.

*Primary Examiner*—William H Rodriguez
*Assistant Examiner*—Gerald L Sung
(74) *Attorney, Agent, or Firm*—Buchanan Ingersoll & Rooney PC

(57) ABSTRACT

The invention relates to a method for determination of a temperature, mass-averaged over a flow cross-section, of a gas flow in a gas turbine or the like, particularly during partial load operation of the gas turbine. The invention also relates to a control apparatus, which can be operated using the method according to the invention, for controlling a gas turbine installation.

The method according to the invention comprising the steps of the temperature value of the gas flow being detected by a sensor or sensors at at least one position in the gas flow in the area of the flow cross-section, of determination of a correction value for correction of the temperature value for compensation for non-uniformities in the temperature profile of the gas flow across the flow cross-section as a function of at least one operating-point-specific parameter, and of correcting the temperature value, which is recorded by a sensor or sensors, by the correction value.

11 Claims, 4 Drawing Sheets

U.S. PATENT DOCUMENTS

| | | | |
|---|---|---|---|
| 3,885,436 A | * | 5/1975 | Meyer .................. 374/118 |
| 3,955,359 A | * | 5/1976 | Yannone et al. ......... 60/39.281 |
| 3,990,308 A | | 11/1976 | McCormick et al. |
| 4,058,975 A | | 11/1977 | Gilbert et al. |
| 5,080,496 A | | 1/1992 | Keim et al. |
| 5,106,203 A | * | 4/1992 | Napoli et al. ............ 374/144 |
| 5,165,225 A | | 11/1992 | Lampe et al. |
| 5,479,350 A | * | 12/1995 | Barakchi et al. ......... 701/100 |
| 2004/0148940 A1 | * | 8/2004 | Venkateswaran et al. ...... 60/772 |

FOREIGN PATENT DOCUMENTS

| | | |
|---|---|---|
| DE | 14 76 778 A1 | 5/1969 |
| DE | 1 601 556 A1 | 2/1970 |
| DE | 16 01 556 A1 | 2/1970 |
| DE | 20 48 807 A1 | 5/1971 |
| EP | 0 728 919 A1 | 8/1996 |
| GB | 717 371 | 10/1954 |
| JP | 61 104124 | 5/1986 |

* cited by examiner

METHOD FOR DETERMINATION OF THE TEMPERATURE, MASS-AVERAGED OVER A FLOW CROSS-SECTION, OF A GAS FLOW IN A GAS TURBINE

TECHNICAL FIELD

The invention relates to a method for determination of the temperature, mass-averaged over a flow cross-section, of a gas flow in a gas turbine, in particular the turbine outlet temperature, mass-averaged over the flow cross-section, of the gas flow in the gas turbine. The invention also relates to a control apparatus in which a method such as this can be used.

PRIOR ART

Present-day control methods for gas turbine installations, gas turbines, gas turbine sets or the like frequently use the turbine outlet temperature, in addition to other control input variables, as a control input variable that is significant for control purposes. It is thus possible, for example, on the basis of the turbine outlet temperature and taking into account the enthalpy turnover in the turbine to deduce the turbine inlet temperature, which provides an upper limit for the combustion temperature in the gas turbine, owing to the maximum permissible material temperature for the turbine blade system.

FIG. 1 shows the design of a gas turbine installation 100 such as this, by way of example, illustrated schematically. The stationary gas turbine installation 100 illustrated here comprises a compressor 101 on whose input side air is induced from the environment U, and which compressor 101 compresses this air. The compressor 101 is connected for drive purposes, such that they rotate together, via a shaft 105 to a turbine 104. A combustion chamber 102 is arranged in the gas path between the compressor 101 and the turbine 104, and is fed with fuel via the fuel supply line 103, for combustion. After passing through the turbine 104, the gas mixture flows out via an exhaust gas line 106 into the environment U. The turbine 104 is in turn drive-connected to a generator 108 via a shaft 17. During operation of the gas turbine installation 100, the generator 108 which is driven by the turbine 104 produces electricity, which is emitted via a power line and a transformer to an electrical network 109. In order to make it possible to supply electricity to installation components particularly during the starting-up phase of the gas turbine installation 100, the installation also includes a power supply set 110.

Furthermore FIG. 1 shows the inlet and outlet levels of the gas turbine installation 100 in accordance with the ASME Standard in the flow direction of the gas turbine, numbered from 1 to 11, with the numbers in each case being in a circle.

In order to allow the turbine outlet temperature to be measured, thermocouples are normally installed in the turbine outlet level or in a plenum arranged downstream from the turbine outlet, and project into the gas flow. The thermocouples are expediently arranged in accordance with international guidelines. Since, however, the turbine outlet temperature detected in this way forms an input variable which is highly important for control of the gas turbine, the accuracy of the instrumentation, the adjustment of the instrumentation, the data acquisition and data reduction as well as the filtering of random measurement errors are in this case subject to particularly stringent requirements.

The temperature values detected by the thermocouples are averaged after being detected by a sensor or sensors by means of mass weighting, in order in this way to make it possible to deduce the turbine outlet temperature, mass-averaged over the flow cross-section. The turbine inlet temperature or the combustion chamber outlet temperature is then obtained on the basis of the mass-averaged turbine outlet temperature via a thermal balance, in accordance with the international ISO Standard 2314:1989 or the American national ASME Standard PTC 22-1997.

In this context, ASME PTC 22-1997 provides for the gas turbine manufacturer to specify the number and position of the temperature detection elements installed in the turbine outlet level or in the plenum arranged downstream from the turbine. Known system-dependent physical discrepancies must in this case be taken into account. Matched to these temperature measurement points, the gas turbine manufacturer should also determine a function between the averaged measured turbine outlet temperature and the turbine inlet temperature for the particular design application.

In practice, gas turbines are generally designed such that any non-uniformity in the radial flow distribution in the turbine outlet level or in the plenum downstream from the turbine is minimized at least for the design operating point, that is to say in general the full-load point. The measured turbine outlet temperature thus normally largely matches the mass-weighted average temperature value.

However, if the gas turbine is not being operated at the design operating point, then the effect of the radially non-uniform flow distribution and temperature distribution in some cases will have a considerable effect on the mass-weighted temperature in the turbine outlet level, or the turbine outlet plenum. This effect is physically governed by the expansion of the turbine flow in the radial direction. If a mean temperature for the turbine outlet flow is now calculated on the basis of a measured temperature value by means of the correlation determined in accordance with ASME PTC 22-1997, then the mean temperature determined in this way will in some cases differ considerably from the actual mass-averaged temperature, particularly when the gas turbine is being operated in the partial load range. The difference may in this case be up to several 10 Kelvin. If, furthermore, the mean temperature determined in this way in accordance with ASME PTC 22-1997 is now also used as an input variable for controlling the gas turbine, for example for controlling the fuel mass flow to the gas turbine, then the actual control will consequently in some cases also differ considerably from the desired nominal control. Thus, particularly in the partial load range, precise control is often not possible in a present-day gas turbine installation, since a high degree of uncertainty and fluctuation range of the control input variable must be taken into account. In practice, this means that greater safety margins must be maintained from temperature limits which means, for example, that the gas turbine can be started up only more slowly than would actually be possible.

DESCRIPTION OF THE INVENTION

The invention is intended to overcome this problem. The invention is thus based on the object of specifying a method of the type mentioned initially by means of which the disadvantages of the prior art are reduced or avoided. A further aim of the invention is to provide a control apparatus which can be operated using the method.

In this context, the invention contributes in particular to a determination of a turbine outlet temperature, mass-averaged over the flow cross-section, of a gas turbine or the like with high accuracy, even for operating points other than the design operating point.

According to the invention, this object is achieved by the method as claimed in claim 1, and by the control apparatus as claimed in the independent apparatus claim. Further advantageous refinements of the invention can be found in the dependent claims.

The method according to the invention for determination of a temperature, mass-averaged over a flow cross-section, of the gas flow in a gas turbine or the like, in particular in order to determine the turbine outlet temperature, mass-averaged over the turbine outlet cross-section, comprises the use of the sensor or sensors to detect a temperature value at at least one position in the gas flow in the area of the flow cross-section level, the determination of a correction value for correction of the temperature value in order to compensate for non-uniformities in the temperature profile in the gas flow over the flow cross-section as a function of at least one operating-point-specific parameter, and the use of the correction value to correct the temperature value which has been detected by a sensor or sensors. The expression in the area of the flow cross-section level means either in the flow cross-section level itself or in a plenum which is adjacent to the flow cross-section level, downstream from it.

It has been found that the method according to the invention allows more accurate determination of the temperature, mass-averaged over the flow cross-section, in particular the turbine outlet temperature, mass-averaged over the turbine outlet cross-section, particularly when the gas turbine is being operated in the partial load range, than is possible using methods which are known from the prior art.

As a consequence of this, by way of example, a control process in which the mass-averaged turbine outlet temperature forms a control input variable can be operated with narrower safety margins from critical operating points, even in the partial load range. The safety margins which have been required in the past can in consequence be considerably minimized, thus leading to greater efficiency and improved dynamic gas turbine performance.

Because of the fact that, on the basis of the method according to the invention, the correction value is determined as a function of at least one operating-point-specific parameter, operating-point-specific non-uniformities in the flow distribution and temperature distribution over the height of the flow channel are implicitly taken into account in the correction value. The flow distribution and temperature distribution non-uniformities which are formed over the height of the flow channel over the operating range of a gas turbine can for this purpose be determined in advance either by means of reference measurements or by means of CFD calculations as a function of the at least one operating-point-specific parameter. Those skilled in the art are familiar with how to carry out such reference measurements or CFD calculations. Reference measurements require complex instrumentation with combined measurement of at least the temperature and of the pressure in the relevant flow level or in a plenum downstream from the flow level, for example the turbine outlet level of the plenum downstream from the turbine outlet level. In addition, the temperature and pressure must be measured staggered over the height of the flow channel and preferably distributed around the circumference as well, in which case the sensor signals should as far as possible be recorded simultaneously. Determination of the temperature profiles by means of CFD calculations can thus be associated with less effort.

The first method step of the method according to the invention expediently comprises the use of a sensor or sensors to detect a plurality of individual temperature values distributed at the turbine outlet, and the averaging of the detected individual temperature values to form a temperature value. The measurement of a plurality of individual temperature values with subsequent averaging of the individual temperature values makes it possible to largely eliminate stochastically distributed temperature fluctuations as well as malfunctions of individual sensors.

According to one advantageous development of the invention, the gas mass flow flowing through the flow cross-section is used as an operating-point-specific parameter. It has been found that the gas mass flow flowing through the flow cross-section represents a suitable measure for the formation of non-uniformities in the flow. The non-uniformity in the flow can thus be described as a function of only one variable. According to a further advantageous development of the invention, the reduced gas mass flow flowing through the flow cross-section is used as an operating-point-specific parameter.

According to a further advantageous development of the invention, the total absolute or static absolute pressure at the compressor outlet of the gas turbine and/or the total or static atmospheric overpressure at the compressor outlet of the gas turbine are/is used as an operating-point-specific parameter. The sensor complexity for a pressure measurement is comparatively low. According to a further advantageous development of the invention, the turbine pressure ratio is used as an operating-point-specific parameter.

The operating-point-specific parameters described above can each be used on their own or else in conjunction with one another to determine the correction value. When using a plurality of operating-point-specific parameters for determination of the correction value, the complexity for the reference measurements and/or CFD calculations to be carried out in advance increases considerably, however. In contrast, the increase in the accuracy decreases as further operating-point-specific parameters are added.

If the gas mass flow flowing through the flow cross-section or the reduced gas mass flow flowing through the flow cross-section at the turbine outlet is used as an operating-point-specific parameter, then at least one state parameter of the gas turbine is expediently detected by means of a sensor or sensors, and the gas mass flow flowing through the flow cross-section and/or the reduced gas mass flow flowing through the flow cross-section is determined on the basis of the at least one state parameter.

The shaft rotation speed of the gas turbine is preferably detected by a sensor or sensors as a state parameter. The mass flow can then be determined on the basis of the measured rotation speed by means of a previously determined correlation between the rotation speed and the mass flow. In general, the rotation speed of the compressor can be determined with little sensor complexity. Particularly for applications in which control safety margins must be complied with for other reasons, accuracy of the mass flow determined solely on the basis of the rotation speed may be adequate.

However, in other applications, it may often be expedient to furthermore use a sensor or sensors to detect at least one of the following variables or variable pairs as a state parameter, and to use them to determine the mass flow in the turbine outlet level and/or the reduced mass flow in the turbine outlet level:

environmental pressure; and/or
  environmental temperature and compressor inlet temperature and/or environmental temperature and relative or absolute humidity of the environment; and/or
  inlet pressure loss from the environment to the compressor inlet; and/or
  fuel mass flow; and/or
  when water is injected within the gas turbine, the injected amount of water; and/or if the gas turbine compressor has variable inlet guide vanes, the position of the variable inlet guide vanes.

In particular, the mass flow and thus, in the end, the turbine outlet temperature can be determined very accurately by the use of a sensor or sensors to detect and process all the other state parameters.

In order to determine the reduced mass flow, at least one of the following variables or variable pairs is or are expediently also detected by a sensor or sensors as a state parameter and is or are used to determine the reduced mass flow, or is or are included in the determination of the correction value:

absolute pressure at the turbine outlet; and/or
pressure loss in the gas flow between the turbine outlet and the outlet of the gas turbine.

If the total absolute or static absolute pressure at the compressor outlet of the gas turbine and/or the total or static atmospheric overpressure at the compressor outlet of the gas turbine are/is used as an operating-point-specific parameter, then the total absolute or static absolute pressure at the compressor outlet of the turbine and/or the total or static atmospheric overpressure at the compressor outlet of the turbine is expediently detected by a sensor or sensors as a state parameter of the gas turbine, and is used directly to determine the correction value.

In particular, the static pressure can be determined with little effort via a wall pressure bore and a pressure measurement capsule connected to it.

The environmental pressure is preferably additionally detected by a sensor or sensors as a state parameter of the gas turbine in order to increase the accuracy of the correction value determination, and this can likewise be included in the determination of the correction value.

If the turbine pressure ratio is used as an operating-point-specific parameter, then the total absolute or static absolute pressure at the turbine inlet of the gas turbine and the total absolute or static absolute pressure at the turbine outlet of the gas turbine are expediently detected by a sensor or sensors and are used directly for determination of the turbine pressure ratio. At least one of the following variables or variable pairs is or are preferably also detected by a sensor or sensors as a state parameter for this purpose in order to increase the accuracy of the correction value, and is used to determine the correction value:

environmental pressure; and/or
pressure loss in the gas flow between the turbine outlet and the outlet of the gas turbine; and/or
pressure loss in the gas flow between the compressor outlet and the turbine inlet; and/or
total absolute or static absolute pressure at the compressor outlet or total or static atmospheric overpressure at the compressor outlet.

In a further aspect, the invention provides a control apparatus for controlling a gas turbine installation, a gas turbine, a gas turbine set or the like. The control apparatus according to the invention can be operated in accordance with the method described above in order to determine the temperature, mass-averaged over a flow cross-section, of a gas flow, in particular of a turbine outlet temperature, mass-averaged over the turbine outlet cross-section, of the gas flow in a gas turbine or the like. The control apparatus for this purpose has a suitable sensor system as well as an actuator system in addition to a calculation and control unit. The sensor system has at least one sensor in accordance with the refinement of the method, with the sensor signal being supplied to the calculation and control unit. The turbine outlet temperature is then calculated in the calculation and control unit on the basis of the sensor signals supplied to the calculation and control unit. On the basis of the turbine outlet temperature determined in this way, either the turbine inlet temperature is additionally deduced from this in an intermediate step, and a control value is derived from it, and the control value is derived directly. The control value may also be dependent in a known manner on further input variables, for example a value preset by the operator. The control value determined in this way is then supplied from the calculation and control unit to the actuator system, for example a valve for controlling the fuel flow, thus resulting in the respective actuator carrying out an action corresponding to the control value.

BRIEF DESCRIPTION OF THE DRAWINGS

The invention will be explained in more detail in the following text with reference to one exemplary embodiment, which is illustrated in the figures, in which.

The figures show only those elements and components which are significant to understanding of the invention.

The illustrated exemplary embodiment should be regarded as being purely instructional and is intended to be used to assist understanding, but not as any restriction of the subject matter of the invention.

APPROACHES TO IMPLEMENTATION OF THE INVENTION

Figure 1:
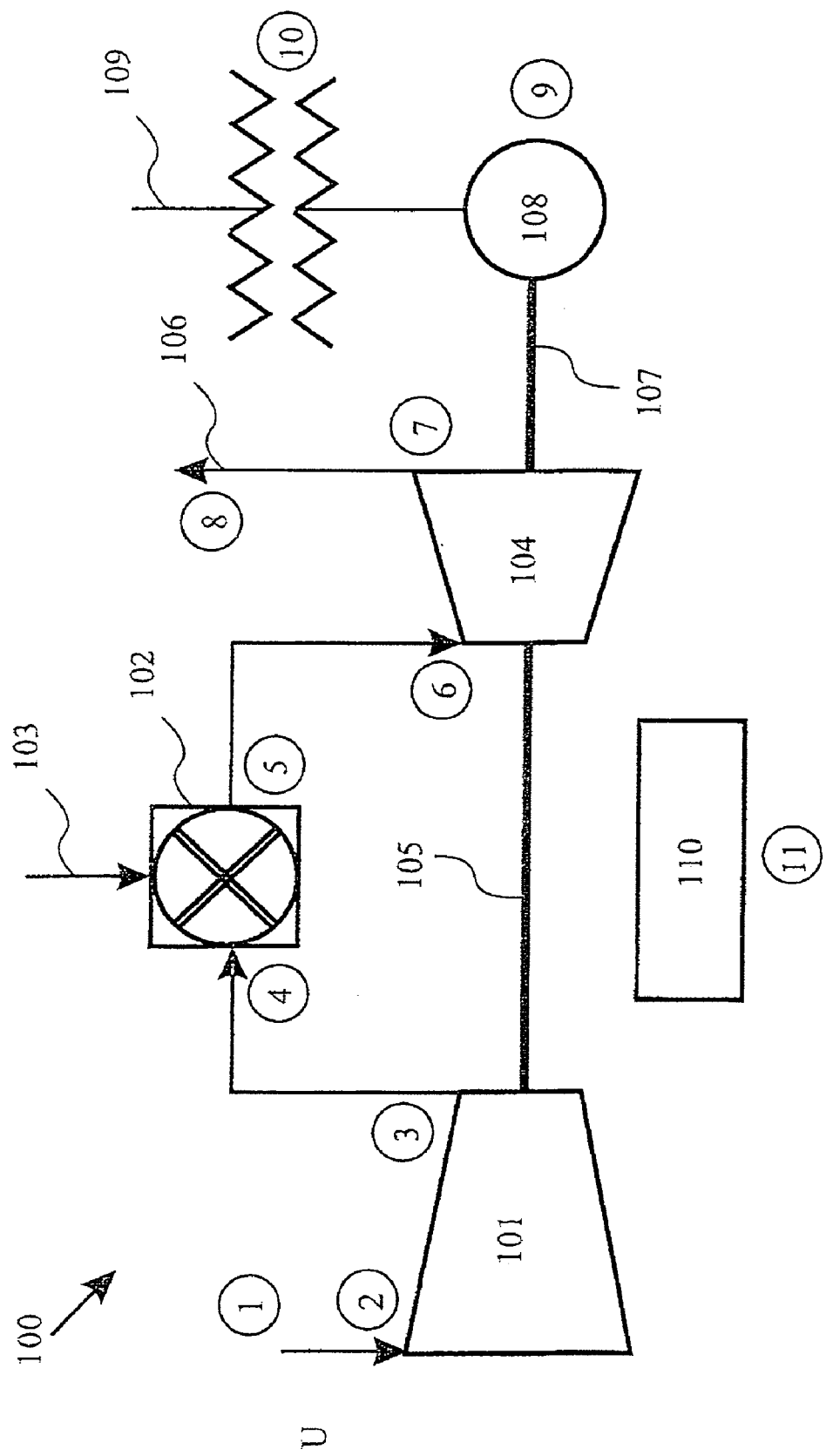
FIG. 1 shows a schematic illustration of a gas turbine installation (prior art)

FIG. 1 shows a schematic illustration of a gas turbine installation or a gas turbine set 100, as will be familiar to those skilled in the art. The gas turbine installation 100 is in this case in the form of a stationary gas turbine installation, and is used for electricity generation.

As already described above, the stationary gas turbine installation 100 illustrated by way of example here comprises a compressor 101 which induces air from the environment U on the inlet side, and compresses it. The compressor 101 is connected for drive purposes and such that they rotate together via a shaft 105 to a turbine 104. A combustion chamber 102 is arranged in the gas path between the compressor 101 and the turbine 104, and is fed with fuel via the fuel supply line 103 for combustion. After passing through the turbine 104, the air/combustion gas mixture flows away via an exhaust gas line 106 to the environment. The turbine 104 is connected for drive purposes via a further shaft 107 to a generator 108. The shafts 105 and 107 may also be integral. During operation of the gas turbine installation 100, the generator 108 which is driven by the turbine 104 generates electricity, which is emitted to an electrical network 109 via a power line and a transformer. In order to allow electricity to be supplied to installation components, particularly in the starting-up phase of the gas turbine installation 100, the installation also has an associated power supply set 110.

Furthermore, the inlet and outlet levels of the gas turbine installation are annotated with numbers from 1 to 11 in the flow direction of the gas turbine, in accordance with the ASME Standard.

It is, of course, also possible for the gas turbine installation to have more than one shaft, more than one turbine and intermediate combustion chambers, with more than one compressor and intermediate coolers, and the like. These embodiments will be familiar to those skilled in the art and, merely place the invention in a context relevant to the application, so that they will not be described in any more detail at this point.

Figure 2:
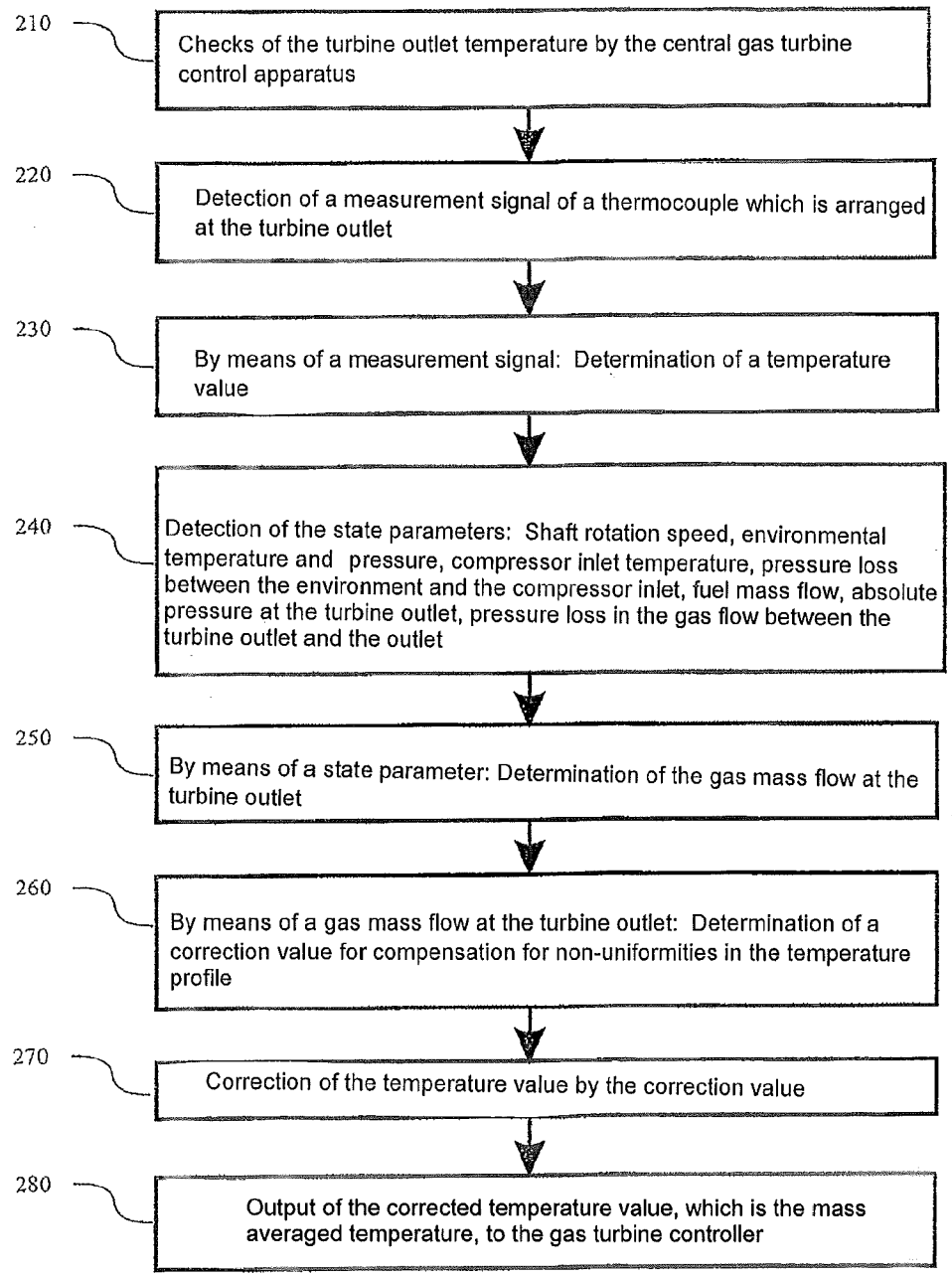
FIG. 2 shows a first embodiment of the method according to the invention in the form of a flowchart.
Figure 3:
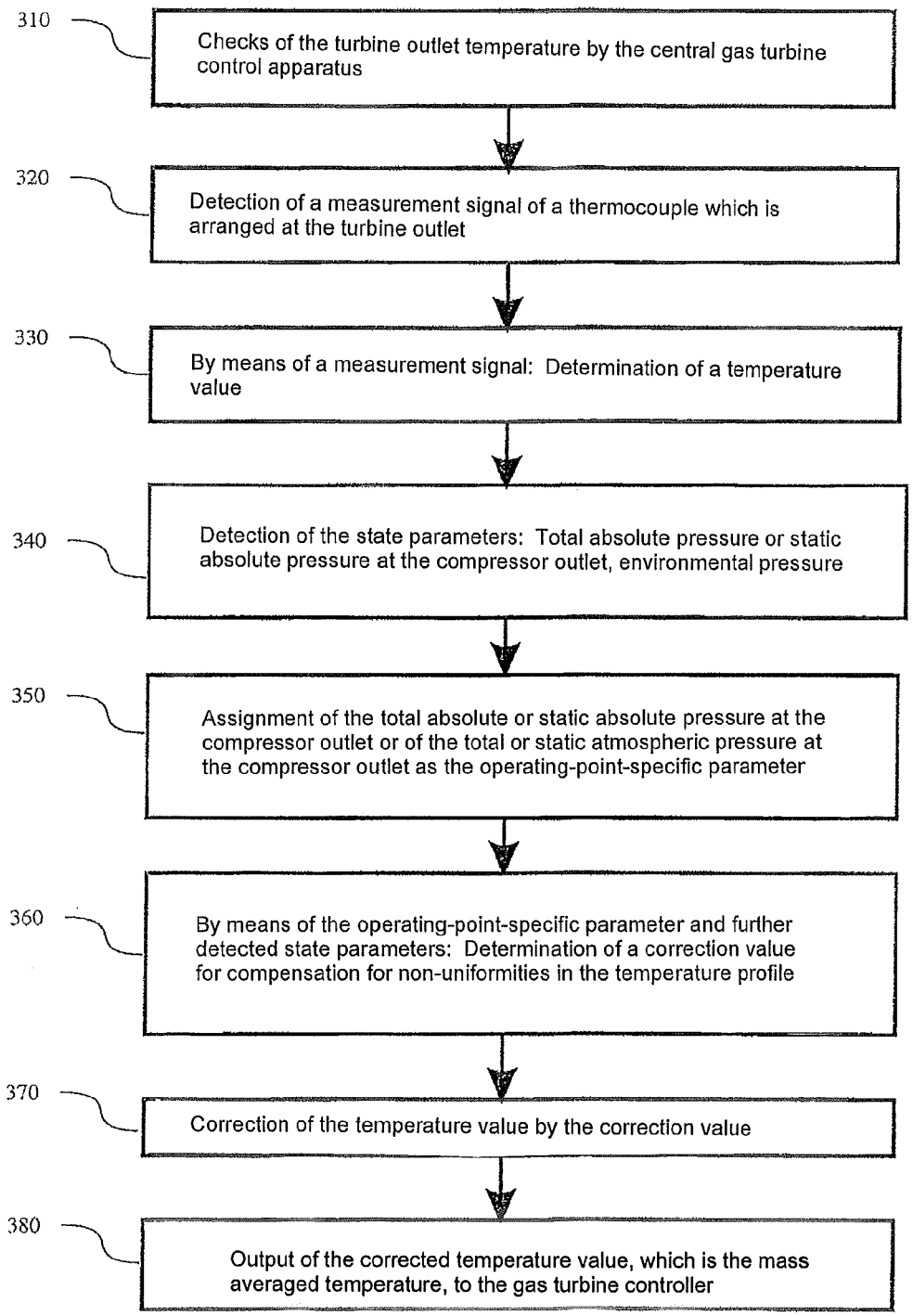
FIG. 3 shows a second embodiment of the method according to the invention, in the form of a flowchart.
Figure 4:
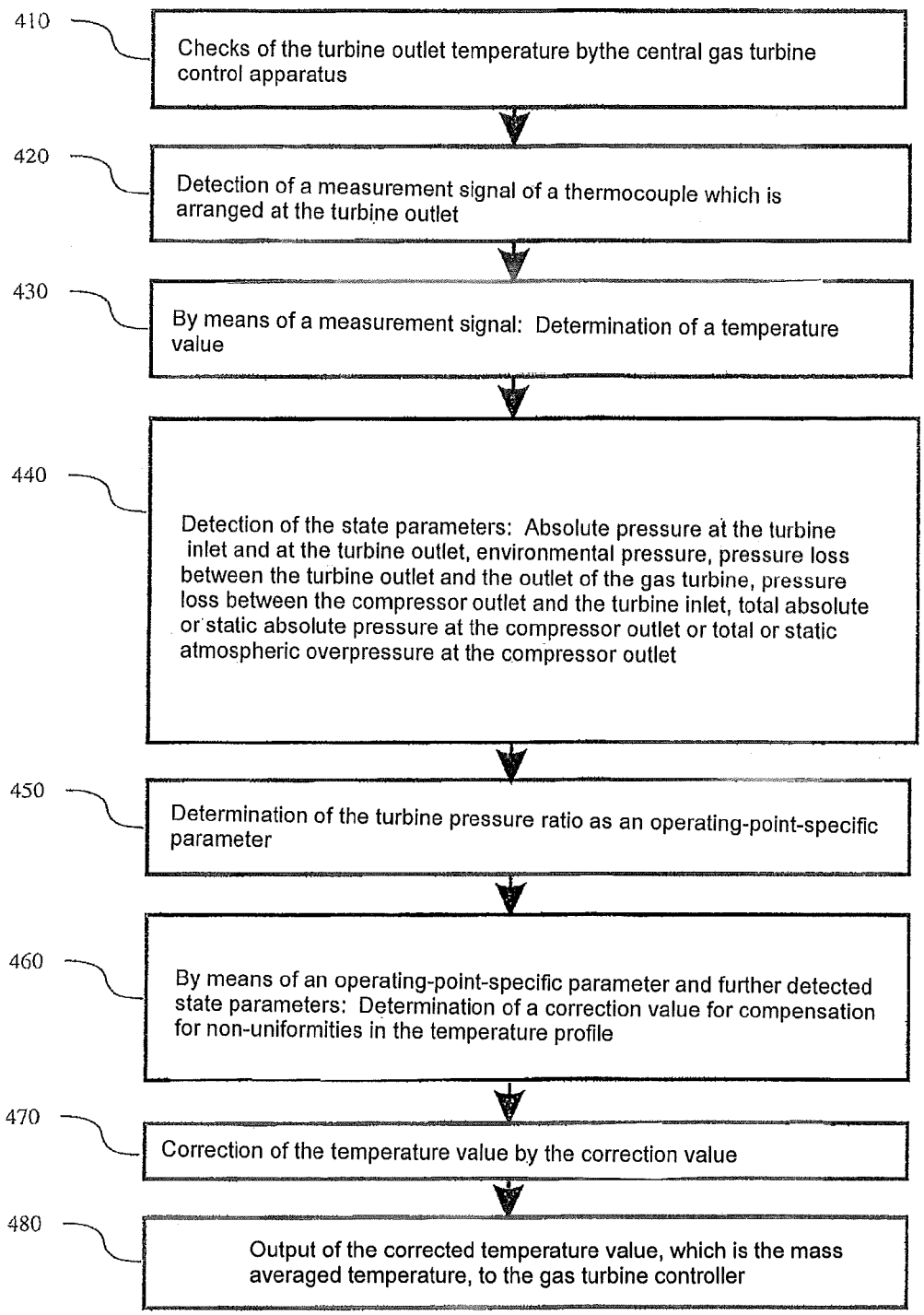
FIG. 4 shows a third embodiment of the method according to the invention, in the form of a flowchart.

FIGS. 2, 3 and 4 show method procedures according to the invention for determination of a turbine outlet temperature, mass-averaged over the flow cross-section, in a gas turbine, in each case in the form of a flowchart. The method procedures illustrated here are in this case each in the form of integral components of the control loop procedures for a gas turbine control apparatus. As is illustrated in FIGS. 2, 3 and 4, this means that the method procedure for determination of the mass-averaged turbine outlet temperature is in each case initiated in the method steps 210, 310 and 410 via the gas turbine control system, and the determined result is transferred in the respective method steps 280, 380 and 480 to the gas turbine control system, for further processing. Although, on the basis of the procedure steps illustrated in FIGS. 2, 3 and 4, the method according to the invention can in principle also be carried out outside the gas turbine control apparatus, the invention, of course, also includes the capability for the method according to the invention to operate as an integral part of the control method of the gas turbine installation within the gas turbine control apparatus.

In FIG. 2, after the start of the method procedure and in accordance with the method step 210, a measurement signal from a thermocouple whose temperature-sensitive measurement bead projects into the gas flow in the turbine outlet level is first of all detected in a subsequent method step 220. A temperature value is then calculated from this in the method step 230 on the basis of the detected measurement signal from the thermocouple although, however, this then reflects only the temperature at the measurement point itself. Non-uniformities in the temperature profile, such as those which normally occur in particular in the radial direction of the flow channel are, however, not recorded here. The correction procedures which are known from the prior art, for example in accordance with the correlation according to ASME PTC 22-1997 as described above, also produce relatively inaccurate temperature values, in particular when the gas turbine is being operated in the partial load range. A gas turbine control system based on this is thus forced to maintain relatively wide safety margins. In order to allow better measured value corrections to be carried out than those with the methods known from the prior art, the state parameters comprising the shaft rotation speed of the gas turbine, the environmental temperature and environmental pressure, compressor inlet temperature, fuel mass flow, absolute pressure at the turbine outlet and the pressure loss of the gas flow between the turbine outlet and the outlet of the gas turbine are detected by means of a sensor or sensors in the method step 240 in the exemplary embodiment illustrated in FIG. 2. In addition, if water is injected into the compressor or the combustion chamber, the injected amount of water and, if the compressor has variable inlet guide vanes, the position of the variable inlet guide vanes, are detected by a sensor or sensors. In the method step 250, the gas mass flow in the turbine outlet level is determined as an operating-point-specific parameter by means of the state parameters detected by means of a sensor or sensors. In the method step 260, the gas mass flow is once again used to determine a temperature correction value for compensation for non-uniformities in the temperature profile of the gas flow. The correlation required for this purpose between the gas mass flow in the turbine outlet level and the temperature correction value will have already been determined either by reference measurements by means of CFD calculations, and are preferably stored in the form of a family of characteristics.

After determination of the temperature correction value in accordance with method step 260, the temperature value determined on the basis of the measurement signal in method step 230 is corrected, in method step 270, by the determined temperature correction value in order in this way to obtain a mean temperature, mass-averaged over the turbine outlet cross-section. The mean temperature mass-averaged over the turbine outlet cross-section is then transferred in the method step 280 to the gas turbine control system, where it is used as an input variable for determination of control values, for example for the fuel mass flow to be supplied to the combustion chamber.

It has been found that the error in the determination of the mass-averaged temperature at the turbine outlet can be reduced by the determination of the temperature correction value as a function of the gas mass flow in the turbine outlet level to a few Kelvin and, if the gas mass flow at the turbine outlet is determined very accurately, even to less than one Kelvin. The control process can thus be based on considerably more precise mass-averaged temperature values, so that only small safety margins need be complied with in the control system.

The exemplary embodiment illustrated in FIG. 3 differs from the exemplary embodiment illustrated in FIG. 2 in that, in this case, the total absolute or static absolute pressure at the compressor outlet of the gas turbine is determined in the method step 350 as the operating-point-specific parameter rather than the gas mass flow in the turbine outlet level, and is used in the method step 360 as the input variable for determination of the temperature correction value. Alternatively, the total or static atmospheric overpressure at the compressor outlet of the gas turbine could also be used as an operating-point-specific parameter in this case.

In order to obtain the "total pressure at the compressor outlet of the gas turbine" as the operating-point-specific parameter, the total pressure at the compressor outlet of the gas turbine is detected by a sensor or sensors as a state parameter for the gas turbine in the method step 340, that is to say it is measured by means of a pitot probe which projects into the gas flow. If, alternatively, the static pressure at the compressor outlet is used as the operating-point-specific parameter for the gas turbine, then, in this case, the static pressure at the compressor outlet must be measured as the state parameter for the gas turbine. The latter measurement can be carried out easily by means of one or more wall bores.

In addition, the environmental pressure is, however, also detected by means of a sensor or sensors as a state parameter for the gas turbine in the method step 340, and is used for determination of the correction value. This means that the correlation for determination of the correction value also has to provide both pressures as input variables.

The exemplary embodiment illustrated in FIG. 4 differs from the exemplary embodiments illustrated in FIGS. 2 and 3 in that, in this case, the turbine pressure ratio is determined as the operating-point-specific parameter in the method step 450, and is used as an input variable for determination of the temperature correction value in the method step 460.

In order to obtain the "turbine pressure ratio" as the operating-point-specific parameter, the absolute pressure at the turbine inlet of the gas turbine and the absolute pressure at the turbine outlet are detected by a sensor or sensors in the method step 440 as state parameters for the gas turbine, that is to say they are each measured by means of at least one pitot probe which projects into the gas flow in the corresponding plane. In addition, however, the environmental pressure, the pressure loss in the gas flow between the turbine outlet and the outlet of the gas turbine, the pressure loss in the gas flow between the compressor outlet and the turbine inlet, and the total absolute or static absolute pressure at the compressor outlet or the total or static atmospheric overpressure at the compressor outlet are detected by means of a sensor or sensors as state parameters for the gas turbine in the method step 440 in this case, and are used to determine the correction value.

The method procedures illustrated in FIGS. 2 to 4 represent only exemplary embodiments of the invention, which can invariably be modified in many ways without any problems by a person skilled in the art without departing from the idea of the invention. Thus, for example, a plurality of thermocouples can be arranged distributed on the turbine outlet plane as sensors to detect the temperature at the turbine outlet, and the temperature value can be determined as the mean value if the signals from the thermocouples.

LIST OF REFERENCE SYMBOLS 1-11 Levels in a gas turbine installation in accordance with ASME PTC 22-1997
100 Gas turbine installation
101 Compressor
102 Combustion chamber
103 Fuel supply line
104 Turbine
105 Shaft between the compressor and turbine
106 Exhaust gas line
107 Shaft between the turbine and generator
108 Generator
109 Network
110 Power supply set
U Environment
210-280 Method steps for a first embodiment of the method according to the invention
310-380 Method steps for a second embodiment of the method according to the invention
410-480 Method steps for a third embodiment of the method according to the invention

The invention claimed is:

1. A method for correcting a temperature value so that it more closely approximates a mass-averaged temperature over a flow cross-section at an outlet of a turbine of a gas turbine, wherein the temperature value is a value detected by a sensor or sensors in the area of the flow cross-section at at least one position in the gas flow, the method comprising correcting the temperature value in order to compensate for non-uniformities in the temperature profile of the gas flow over the flow cross-section that cause the temperature value and the mass-averaged temperature to differ, with a correction value that is a function of a first parameter, such that the corrected value yields a value that is the mass averaged temperature at non-uniform conditions, wherein the first parameter includes at least one of:
   a gas mass flow flowing through the flow cross-section;
   a reduced gas mass flow flowing through the flow cross-section;
   a total absolute pressure at a compressor outlet;
   a static absolute pressure at the compressor outlet;
   a total atmospheric overpressure at the compressor outlet;
   a static atmospheric overpressure at the compressor outlet; and
   a turbine pressure ratio.

2. The method as claimed in claim 1, wherein the first parameter includes the gas mass flow.

3. The method as claimed in claim 1, wherein the first parameter includes the reduced gas mass flow.

4. The method as claimed in claim 1, wherein the first parameter includes the total absolute or static absolute pressure at the compressor outlet of the gas turbine, or the total or static atmospheric overpressure at the compressor outlet of the gas turbine.

5. The method as claimed in claim 1, wherein the first parameter includes the turbine pressure ratio.

6. The method as claimed in claim 2, wherein at least one of the gas mass flow flowing through the flow cross-section and the reduced gas mass flow flowing through the flow cross-section is determined on the basis of a second parameter, wherein the second parameter includes at least one of:
   a shaft rotation speed of the gas turbine;
   an environmental pressure;
   an environmental temperature and compressor inlet temperature;
   an environmental temperature and relative or absolute humidity of the environment;
   an inlet pressure loss from the environment to the compressor inlet;
   a fuel mass flow;
   an amount of water injected within the gas turbine; and
   a position of variable inlet guide vanes in the gas turbine.

7. The method as claimed in claim 6, wherein the second parameter includes the shaft rotation speed of the gas turbine.

8. The method as claimed in claim 6, wherein the second parameter includes at least one of:
   the absolute pressure at the turbine outlet; and
   the pressure loss in the gas flow between the turbine outlet and an outlet of the gas turbine.

9. The method as claimed in claim 5, wherein the absolute pressure at a turbine inlet of the gas turbine and the absolute pressure at the turbine outlet of the gas turbine are used to determine the turbine pressure ratio.

10. The method as claimed in claim 9, with at least one of the following variables or variable pairs additionally being detected by a sensor or sensors as state parameters, and being used to determine the correction value:
   environmental pressure; or
   pressure loss in the gas flow between the turbine outlet and the outlet of the gas turbine; or
   pressure loss in the gas flow between the compressor outlet and the turbine inlet; or
   total absolute or static absolute pressure at the compressor outlet or total or static atmospheric overpressure at the compressor outlet.

11. A method for correcting a temperature value so that it more closely approximates a mass-averaged temperature over a flow cross-section at an outlet of a turbine of a gas turbine, wherein the temperature value is a value detected by a sensor or sensors in the area of the flow cross-section at at least one position in the gas flow,
   the method comprising correcting the temperature value in order to compensate for non-uniformities in the temperature profile of the gas flow over the flow cross-section that cause the temperature value and the mass-averaged temperature to differ, with a correction value that is a function of a first parameter such that the corrected value yields a value that is the mass averaged temperature at non-uniform conditions.

* * * * *